Nov. 8, 1966  M. J. ZALESKE ETAL  3,284,044
VALVE DISC GUIDE FOR LEVER-OPERATED SOLENOID VALVES
Filed April 3, 1964  2 Sheets-Sheet 1
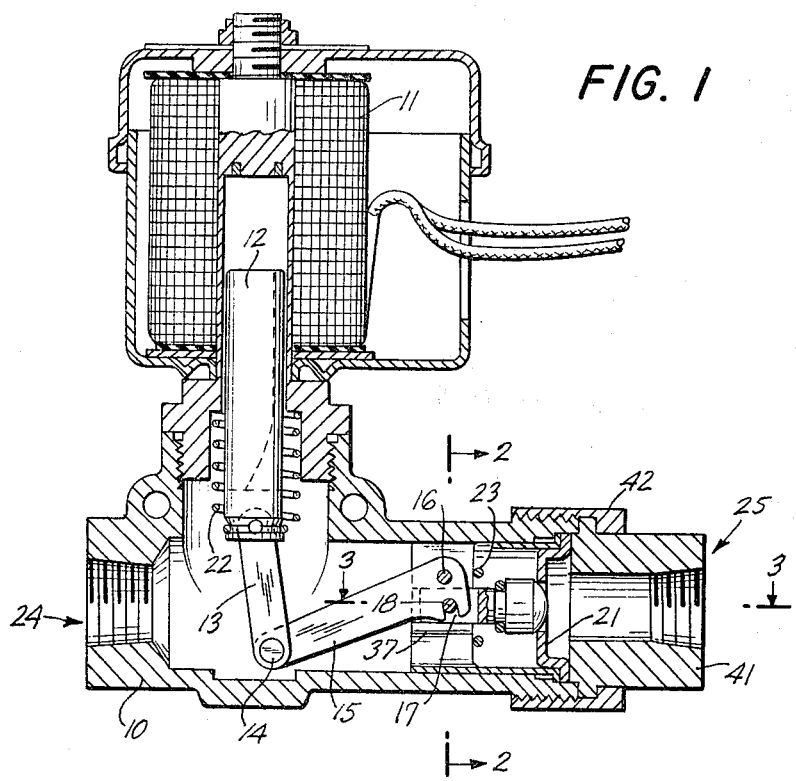
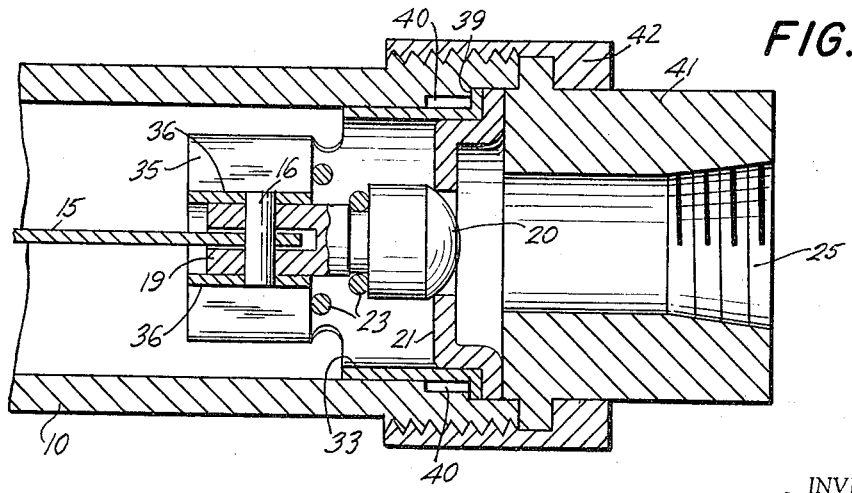
INVENTORS:
MICHAEL J. ZALESKE
ALFRED J. KRYSPIN
BY Frederick Breitenfeld
ATTORNEY

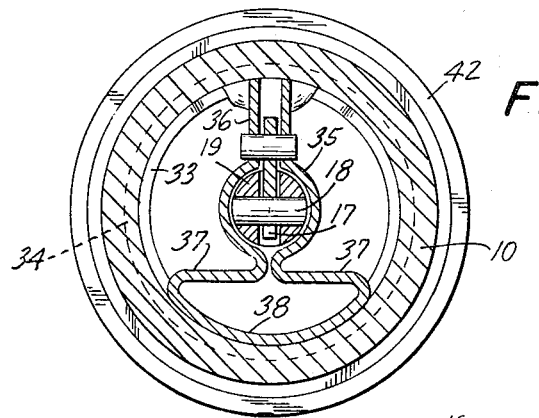
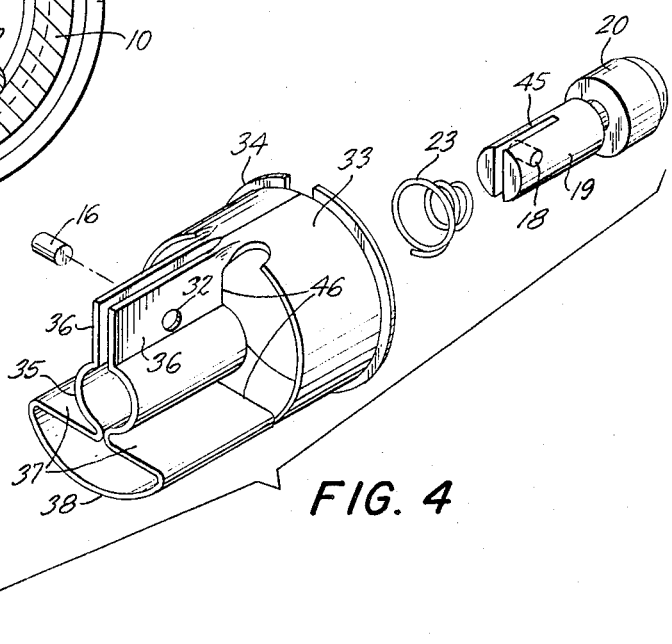
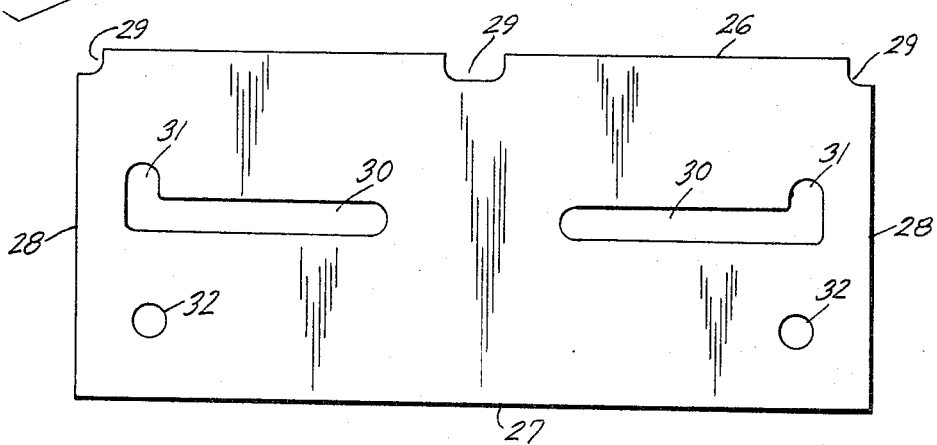

United States Patent Office 3,284,044
Patented Nov. 8, 1966

3,284,044
VALVE DISC GUIDE FOR LEVER-OPERATED SOLENOID VALVES
Michael J. Zaleske, Union, and Alfred J. Kryspin, East Hanover, N.J., assignors to Automatic Switch Co., Florham Park, N.J., a corporation of New York
Filed Apr. 3, 1964, Ser. No. 357,247
5 Claims. (Cl. 251—138)

This invention relates generally to solenoid valves, and has particular reference to lever-operated valves in which a valve disc is reciprocated at a direction crosswise to the direction of movements of the solenoid armature.

It is a general object of the invention to simplify and reduce the cost of manufacture of solenoid valves of the lever-operated kind.

Another general object is to provide structural improvements by means of which the rating of such valves can be increased.

One of the factors contributing to the cost of manufacture and assembly of solenoid valves of the character referred to is the provision of a relatively complex machined element for guiding the movements of the valve disc. This element is commonly constructed of brass, it is relatively expensive and heavy, it occupies space that impedes fluid flow, and it requires careful machining that is time-consuming and relatively costly.

A particular objective of the present invention is to provide a greatly simplified disc guide. The improved disc guide can be manufactured at a small fraction of the cost of the conventional guide, it is much lighter in weight, contributes materially to the ease of assembly of the solenoid valve, and occupies relatively little space. In fact, the fluid flow is enhanced to a substantial degree, as a result of which the solenoid rating is increased, i.e., higher pressures can be dealt with by a solenoid of given size, or solenoids of reduced power can handle fluids at a preselected pressure.

The improved solenoid valve disc guide is characterized by its formation from a relatively inexpensive initially flat element of bendable or deformable metal. The present invention makes it possible to deform a flat substantially rectangular blank to define (a) a front-end relatively large cylindrical region adapted to fit concentrically into the conduit through which the fluid flows, (b) a rear-end smaller concentric cylindrical region adapted slidably to support the valve system, (c) a pair of parallel spaced walls adapted to support the fulcrum region of the lever between them, and (d) a firm anchorage for the rear end of a spring pressing the operative head of the valve disc in a forward direction.

One way of achieving these general objects and advantages, and such other benefits as may hereinafter be pointed out, is illustrated in the accompanying drawings, in which—

FIG. 1 is a cross-sectional view of a solenoid valve embodying the features of this invention;

FIG. 2 is an enlarged cross-sectional view along the line 2—2 of FIG. 1;

FIG. 3 is a fragmentary cross-section, on a similar enlarged scale, along the line 3—3 of FIG. 1;

FIG. 4 is an exploded view of the valve disc, the improved disc guide, and a part of the actuating lever; and FIG. 5 is a face view of the initial flat blank of which the disc guide is formed.

In the device chosen for illustration, a valve housing 10 is associated in conventional fashion with a solenoid 11 provided with an armature 12 adapted to reciproate in an up-and-down direction as viewed in FIG. 1. The lower end of the armature 12 is articulated to a link 13 which is pivoted at 14 to the rear end of an actuating lever 15.

The fulcrum of the lever is at 16, and the shorter arm is provided with a slot 17 adapted to engage with a pin 18 extending crosswise through the valve stem 19. At the forward end of the stem is an enlarged operative valve disc 20 adapted to cooperate with the valve seat 21.

A compression spring 22 is mounted on the armature 12, with its upper end braced against a shoulder on the interior of the valve body, and with its lower end pressing downwardly upon flange at the lower end of the armature. Similarly, a compression spring 23 encircles the valve stem 19 and presses forwardly against the valve head 20. As a result, the valve shown in the present drawings is normally in the closed position shown in FIG. 1 when the solenoid 11 is de-energized. When current is passed through the coil of the solenoid, the armature 12 is drawn upwardly, rocking the lever 15 in a clockwise direction (as shown in FIG. 1) whereby the valve disc is drawn leftward off its seat. This permits fluid to pass through the valve body. It is to be understood that the opposite ends 24 and 25 of the valve body are connected in conventional fashion within a conduit or pipe through which the controlled fluid flow takes place.

The invention has specific reference to the improved structure for supporting and guiding the movements of the valve disc. A flat element of bendable metal, contoured and perforated as shown in FIG. 5 is first provided. This element is substantially rectangular, having longitudinal edges 26 and 27 which are about twice as long as the end edges 28. The edge 26 will ultimately define the front end of the disc guide, and it is preferably notched at intervals, as indicated at 29. Extending longitudinally along the medial region of the blank are a pair of aligned slots 30, each of which has a forwardly directed enlargement 31 at its outer end. Between the slots 30 and the edge 27, and relatively close to the edges 28, are a pair of circular cut-outs 32.

In producing the desired valve disc guide, the flat element of FIG. 5 is distorted as best shown in FIG. 4. The region between the slots 30 and the longitudinal edge 26 is bent around to define a substantially large cylindrical region 33. This means that the length of the initial blank is substantially equal to the circumference of the cylindrical region that is thus formed. The marginal region of the edge 26, between the cut-outs 29, is turned a right angles to define a flange 34. The notches 29 facilitate this deformation.

The region of the blank between the slots 30 and the edge 27 is distorted in a somewhat different way. As best indicated in FIGS. 2 and 4, it is bent to define a cylindrical region 35 which is concentric with the region 33 but of substantially smaller diameter. Extending radially from the region 35 is a pair of spaced parallel walls 36, these walls lying in longitudinal planes and bringing the openings 32 into aligned proximity. Extending tangentially from the cylindrical region 35, at the side opposite to the walls 36, are webs 37 which join at their outer ends with the arcuate part 38 conforming in curvature to that of the cylindrical region 33.

In assembling the valve, the integral stamping is inserted into the valve body from the right, as viewed in FIG. 1. The flange 34 bears against a should 39 provided for this purpose on the valve body. Positioning notches 40 may also be provided, if desired, at 180° spacing, and the stamping may be provided with a small projection (not shown) adapted to fit into one or the other of the notches 40 and thus orient the walls 36 in the desired direction, depending upon the nature of the lever employed and its disposition. The disc guide is held in position by the connector fitting 41 which is itself held in firm engagement with the valve body by the nut 42. During the assembly of the parts a simple valve seat element 21, in the form of a metal stamping or the like, may be interposed between the flange 39 and the fitting 41, as indicated in FIGS. 1 and 3.

The short lever arm is adapted to fit snugly between the spaced walls 36, and a fulcrum pivot pin 16 passes through the openings 32 and through an aligned opening 44 in the lever 15 (see FIG. 4). The valve stem 19 is of course longitudinally slotted as indicated at 45 (FIG. 4) to permit the short lever to come into engagement with the pin 18.

The front edges 46 of the walls 36 and the webs 37 serve as an anchorage for the rear end of the spring 23, the forward end of this spring bearing against the enlarged valve head 20.

If the disc guide is mounted in the valve body in a position turned 180° from that shown in the drawings, and the lever 15 is correspondingly inverted, the parts will operate in essentially the same way except that in the de-energized state of the solenoid the valve disc will be lifted from the valve seat, and the passage of current through the solenoid will result in closing the valve rather than in unseating it.

The advantages of the improved disc guide will be apparent from the description given. It is easy to manufacture and low in cost. It greatly simplifies the assembly of the parts, and it is light in weight and occupies a minimum of space. The flow of fluid through the valve body is impeded to a minimum degree, because it can obviously flow beneath and above the webs 37, and freely on opposite sides of the cylindrical region 35 and the walls 36. Valve ratings are thus materially increased. Coupled with these advantages is the support and guidance of the valve disc in a true concentric relation to the valve seat with which it cooperates.

It will be understood, of course, that many of the details herein described and illustrated may be modified in minor respects by those skilled in the art without necessarily departing from the spirit and scope of the invention as expressed in the appended claims.

What is claimed is:

1. In a solenoid valve of the type in which a reciprocable solenoid armature controls an actuating lever operatively interposed between the armature and a valve disc reciprocable in a direction crosswise to the direction of armature reciprocation, the valve disc comprising an operative part carried by a valve stem a valve disc guide carrying said valve disc, said disc guide comprising a deformed initially flat metallic element, the deformation defining a front-end cylindrical region of larger diameter and a rear-end concentric cylindrical region of smaller diameter, the larger region being adapted to fit concentrically within the conduit through which fluid flow is to be controlled, and the smaller region serving as a support for slidably accommodating said valve stem.

2. In a solenoid valve, the arrangement defined in claim 1 wherein the deformation of said element also provides a pair of spaced walls projecting radially from said smaller cylindrical region in planes parallel to each other and extending longitudinally, said walls being adapted to accommodate part of the actuating lever between them and being provided with aligned openings to support the fulcrum of the lever.

3. In a solenoid valve, the arrangement as defined in claim 2 wherein the deformation of said element also provides a pair of spaced webs extending tangentially with respect to said smaller cylindrical region on the side opposite to said parallel walls, the front edges of said walls and webs serving as a rear anchorage for a compression spring mounted on the valve stem and pressing forwardly upon the operative part of the valve.

4. In a solenoid valve, the arrangement as defined in claim 3 wherein the deformed element in its initially flat state is substantially rectangular, its length being about equal to the circumference of said larger cylindrical region, its width being about equal to the length of said disc guide from front to rear, said element being provided with a pair of aligned slots extending lengthwise, the area on one side of said slots being that which is deformed into said larger cylindrical region, the area on the other side of said slots being that which is deformed to define said smaller cylindrical region, said parallel walls, and said webs.

5. A valve disc guide of the character described, comprising an initially flat metallic element deformed to define a front-end cylindrical region of larger diameter, a rear-end concentric cylindrical region of smaller diameter, a pair of spaced parallel walls extending longitudinally and projecting radially from said smaller cylindrical region, and a pair of webs extending tangentially from said smaller cylindrical region on the side opposite to said walls, said cylindrical region of larger diameter being provided at its front end with an out-turned integral flange.

No references cited.

M. CARY NELSON, *Primary Examiner.*

R. C. MILLER, *Assistant Examiner.*